(12) United States Patent
Kaushik et al.

(10) Patent No.: US 11,803,324 B2
(45) Date of Patent: Oct. 31, 2023

(54) SYSTEM AND METHOD FOR MANAGING TRANSACTIONS IN INTEGRATED CIRCUITS

(71) Applicant: NXP B.V., Eindhoven (NL)

(72) Inventors: Arvind Kaushik, Noida (IN); Nishant Jain, Noida (IN)

(73) Assignee: NXP B.V., Eindhoven (NL)

( * ) Notice: Subject to any disclaimer, the term of this patent is extended or adjusted under 35 U.S.C. 154(b) by 89 days.

(21) Appl. No.: 17/643,597

(22) Filed: Dec. 10, 2021

(65) Prior Publication Data

US 2023/0185484 A1 Jun. 15, 2023

(51) Int. Cl.
*G06F 3/06* (2006.01)

(52) U.S. Cl.
CPC ........... *G06F 3/0659* (2013.01); *G06F 3/0619* (2013.01); *G06F 3/0632* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 5,850,507 A | 12/1998 | Ngai et al. | |
| 10,862,814 B2 | 12/2020 | Kaushik | |
| 2021/0034514 A1* | 2/2021 | Cho et al. | G06F 12/0873 |

FOREIGN PATENT DOCUMENTS

| | | |
|---|---|---|
| EP | 0950955 A2 | 10/1999 |
| EP | 0950955 A3 | 5/2002 |
| EP | 1465085 A2 | 10/2004 |
| EP | 1465085 A3 | 4/2006 |
| WO | 2019/197811 A1 | 10/2019 |

* cited by examiner

*Primary Examiner* — Scott C Sun

(57) ABSTRACT

A transaction management system includes a storage circuit and a processing circuit. The storage circuit stores a current tag value of a tag ID of a device and a tag value associated with a transaction initiated by the device. The processing circuit receives a reset query to determine an availability of the device for reset. When the device is to be reset, the current tag value of the tag ID is updated. Further, the processing circuit generates an acknowledgment in response to the reset query such that the device is reset based on the acknowledgment. The updated tag ID ensures that responses for transactions that are initiated by the device before the reset are discarded.

20 Claims, 6 Drawing Sheets

SYSTEM AND METHOD FOR MANAGING TRANSACTIONS IN INTEGRATED CIRCUITS

FIELD OF USE

The present disclosure relates generally to electronic circuits, and, more particularly, to a system and a method for managing transactions in integrated circuits.

BACKGROUND

In an integrated circuit (IC), a master device initiates various transactions to be performed on a slave device. Such transactions may correspond to read transactions for reading data stored in a memory of the slave device or write transactions for writing data to the memory. While the transactions are in progress, the master device may experience a fault that may lead to an operational failure of the IC.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

DETAILED DESCRIPTION

Figure 1:
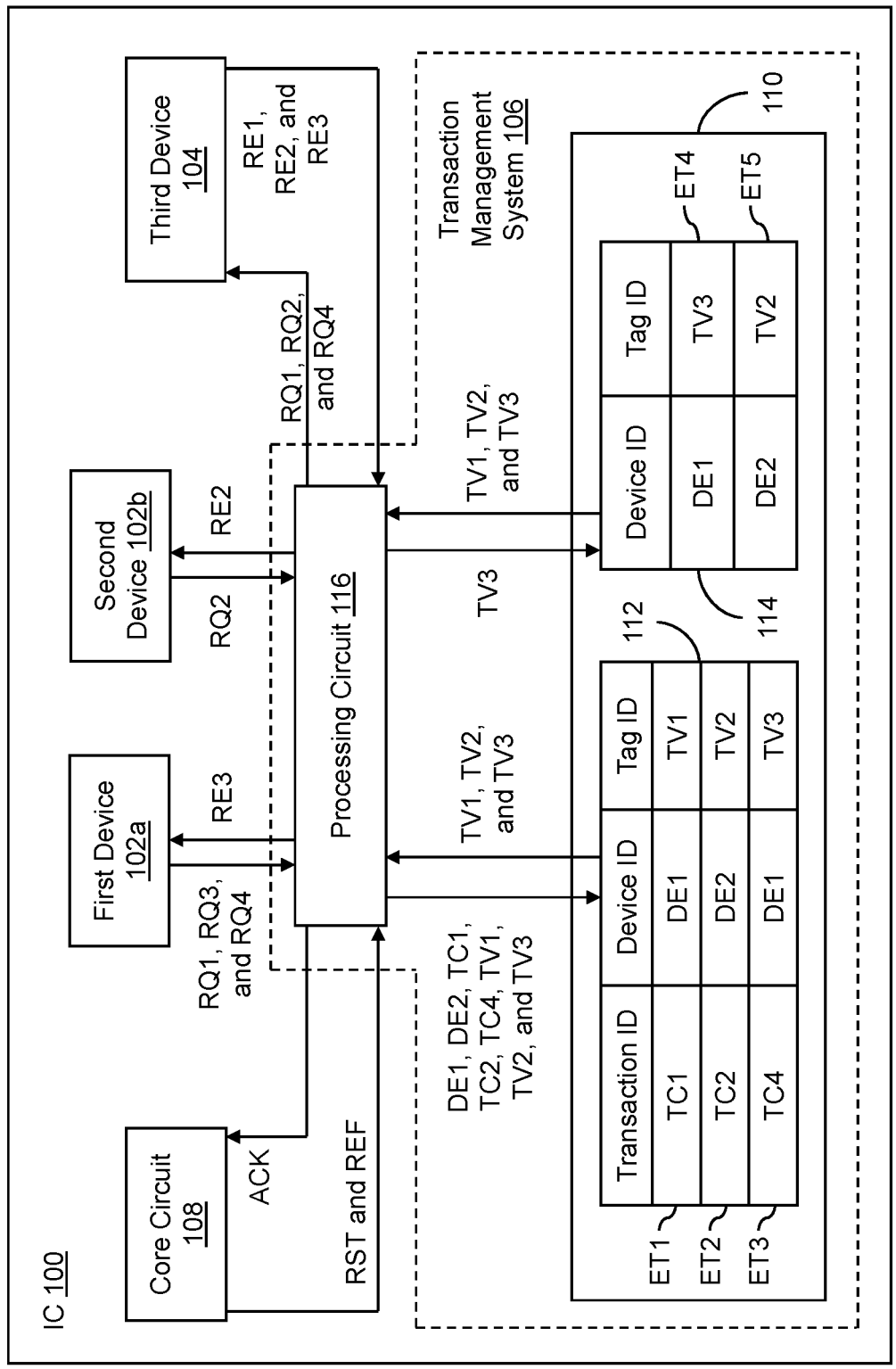
FIG. 1 illustrates a schematic block diagram of an integrated circuit (IC) in accordance with an embodiment of the present disclosure.

The detailed description of the appended drawings is intended as a description of the embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

In one embodiment of the present disclosure, an integrated circuit (IC) is disclosed. The IC may include a first device and a second device. The first device may be configured to initiate a first transaction to be performed on the second device. The IC may further include a storage circuit that may be configured to store a mapping between a first transaction identifier (ID) of the first transaction, a device ID of the first device, and a tag ID of the first device in a first table. The storage circuit may be further configured to store a mapping between the device ID and the tag ID in a second table. The tag ID in each of the first and second tables may have a first tag value. The IC may further include a processing circuit that may be coupled to the storage circuit and the first and second devices. The processing circuit may be configured to receive a reset query. The reset query may be generated to determine an availability of the first device for reset. The processing circuit may be further configured to update, in the second table, the tag ID from the first tag value to a second tag value based on the reset query. Further, the processing circuit may be configured to generate an acknowledgment for the reset query to indicate that the first device is available for reset. The first device is reset based on the acknowledgment. The processing circuit may be further configured to receive, from the second device after the reset of the first device, a first response for the first transaction. Further, the processing circuit may be configured to identify that the tag ID having the first tag value is associated with the first response based on the mapping stored in the first table and discard the first response. The first response is discarded based on the tag ID associated with the first response being different from the tag ID stored in the second table.

In another embodiment of the present disclosure, a transaction management method is disclosed. The transaction management method may include receiving a reset query by a processing circuit. The reset query may be generated to determine an availability of a first device for reset. The reset query may be received after a first transaction is initiated by the first device to be performed on a second device. A mapping between a device ID and a tag ID of the first device and a first transaction ID of the first transaction is stored in a first table, and a mapping between the device ID and the tag ID is stored in a second table. The tag ID in each of the first and second tables has a first tag value. The transaction management method may further include updating, in the second table, the tag ID from the first tag value to a second tag value by the processing circuit. The tag ID may be updated based on the reset query. The transaction management method may further include generating an acknowledgment by the processing circuit for the reset query to indicate that the first device is available for reset. The first device may be reset based on the acknowledgment. The transaction management method may further include receiving by the processing circuit a first response for the first transaction from the second device. The first response may be received after the reset of the first device. Further, the transaction management method may include identifying by the processing circuit that the tag ID having the first tag value is associated with the first response based on the mapping stored in the first table. The transaction management method may further include discarding the first response by the processing circuit based on the tag ID associated with the first response being different from the tag ID stored in the second table.

In some embodiments, the first device may be further configured to generate a first request based on the initiation of the first transaction. The first transaction may be initiated by the first device before the reset of the first device. The first request may include the first transaction ID and the device ID.

In some embodiments, the processing circuit may be further configured to receive the first request for the first transaction from the first device. Based on the device ID, the processing circuit may be further configured to retrieve the tag ID from the second table. The tag ID retrieved from the second table has the first tag value as the first transaction is initiated before the reset of the first device. Further, the processing circuit may be configured to store, in the first table, the mapping between the first transaction ID, the device ID, and the tag ID having the first tag value. The processing circuit may be further configured to provide the first request to the second device. The reset query may be received after the first request is provided to the second device.

In some embodiments, the IC may further include a core circuit. The core circuit may be configured to detect a fault in the first device and determine that the first device is to be reset to recover the first device from the fault. Further, the core circuit may be configured to generate the reset query to determine the availability of the first device for reset and provide the reset query to the processing circuit. The core circuit may be additionally configured to generate a reference tag value that corresponds to the second tag value and provide the reference tag value to the processing circuit. As a response to the reset query, the core circuit may be further configured to receive the acknowledgment from the processing circuit. Further, based on the acknowledgment, the core circuit may be configured to reset the first device.

In some embodiments, the processing circuit may include a transaction controller and a table controller. The transaction controller may be coupled to the core circuit. The transaction controller may be configured to receive the reset query from the core circuit and generate a trigger signal indicating that the tag ID in the second table is to be updated. Additionally, the transaction controller may be configured to receive the reference tag value from the core circuit. The transaction controller may be further configured to generate the acknowledgment and provide the acknowledgment to the core circuit as the response to the reset query. The table controller may be coupled to the transaction controller. The table controller may be configured to receive the trigger signal and update the tag ID from the first tag value to the second tag value in the second table based on the trigger signal. The table controller may be additionally configured to receive the reference tag value from the transaction controller, and further update the tag ID based on the reference tag value.

In some embodiments, the second device may be configured to generate the first response for the first transaction and provide the first response to the processing circuit. The first response may include the first transaction ID and the device ID.

In some embodiments, the first table may include a first plurality of entries and the second table may include a second plurality of entries. The mapping between the first transaction ID, the device ID, and the tag ID having the first tag value is stored in a first entry of the first plurality of entries. The mapping between the device ID and the tag ID is stored in a second entry of the second plurality of entries.

In some embodiments, the processing circuit may be further configured to compare the first transaction ID and the device ID included in the first response with each entry of the first plurality of entries. The processing circuit identifies that the tag ID having the first tag value is associated with the first response based on the comparison of the first transaction ID and the device ID with each entry of the first plurality of entries. The processing circuit may be further configured to compare the device ID included in the first response with each entry of the second plurality of entries and identify that the tag ID having the second tag value is stored in the second table. The processing circuit may be further configured to compare the tag ID associated with the first response with the tag ID stored in the second table. The first response is discarded based on the mismatch between the tag ID associated with the first response and the tag ID stored in the second table.

In some embodiments, the processing circuit may include a response controller that may be coupled to the second device, and a table controller that may be coupled to the response controller and the storage circuit. The response controller may be configured to receive the first response from the second device. Further, the response controller may be configured to generate a first tag query to identify the tag ID associated with the first response, and a second tag query to identify the tag ID stored in the second table. The first tag query may include the first transaction ID and the device ID and the second tag query may include the device ID. The response controller may be further configured to provide the first and second tag queries to the table controller. Further, the response controller may be configured to receive, from the table controller, the tag ID having the first tag value as a response to the first tag query and the tag ID having the second tag value as a response to the second tag query. The response controller may be further configured to compare the response to the first tag query with the response to the second tag query. Based on a mismatch between the responses to the first and second tag queries, the response controller may be further configured to discard the first response.

In some embodiments, the table controller may be configured to receive the first tag query from the response controller and compare the first transaction ID and the device ID with each entry of the first plurality of entries. Based on the comparison of the first transaction ID and the device ID with each entry of the first plurality of entries, the table controller may be further configured to identify that the tag ID having the first tag value is associated with the first response. Similarly, the table controller may be configured to receive the second tag query from the response controller and compare the device ID with each entry of the second plurality of entries. Based on the comparison of the device ID with each entry of the second plurality of entries, the table controller may be further configured to identify that the tag ID having the second tag value is stored in the second table. Further, the table controller may be configured to provide, to the response controller, the tag ID having the first tag value as the response to the first tag query and the tag ID having the second tag value as the response to the second tag query.

In some embodiments, the first device may be further configured to initiate a second transaction to be performed on the second device, generate a second request for the second transaction, and provide the second request to the processing circuit. The second request may include a second transaction ID of the second transaction and the device ID of the first device. The second transaction may be initiated by the first device before the reset of the first device. The processing circuit may be further configured to discard the second request as the reset query is received before the second request is provided to the second device.

In some embodiments, the first device may be further configured to initiate, after the reset of the first device, a third transaction to be performed on the second device. Further, the first device may be configured to generate a third request for the third transaction such that the third request includes a third transaction ID of the third transaction and the device ID of the first device. The processing circuit may be further configured to receive the third request for the third transaction from the first device, and retrieve the tag ID from the second table based on the device ID. The tag ID retrieved from the second table has the second tag value as the third transaction is initiated after the reset of the first device. Further, the processing circuit may be configured to store, in the first table, a mapping between the third transaction ID, the device ID, and the tag ID having the second tag value. The processing circuit may be further configured to provide the third request to the second device.

In some embodiments, the first table may include a first plurality of entries and the second table may include a second plurality of entries. The mapping between the first transaction ID, the device ID, and the tag ID having the first tag value is stored in a first entry of the first plurality of entries. Similarly, the mapping between the third transaction ID, the device ID, and the tag ID having the second tag value is stored in a second entry of the first plurality of entries. Further, the mapping between the device ID and the tag ID is stored in a third entry of the second plurality of entries. The tag ID stored in the second table has the first tag value before the reset of the first device and the second tag value after the reset of the first device.

In some embodiments, the second device may be further configured to generate a second response for the third transaction such that the second response includes the third transaction ID and the device ID.

In some embodiments, the processing circuit may be further configured to receive the second response for the third request from the second device and compare the third transaction ID and the device ID included in the second response with each entry of the first plurality of entries. Based on the comparison of the third transaction ID and the device ID with each entry of the first plurality of entries, the processing circuit may be further configured to identify that the tag ID having the second tag value is associated with the second response. Further, the processing circuit may be configured to compare the device ID included in the second response with each entry of the second plurality of entries and identify that the tag ID having the second tag value is stored in the second table. The processing circuit may be further configured to compare the tag ID associated with the second response and the tag ID stored in the second table and provide the second response to the first device based on the tag ID associated with the second response being same as the tag ID stored in the second table.

In some embodiments, the processing circuit may include a response controller that may be coupled to the first and second devices, and a table controller that may be coupled to the response controller and the storage circuit. The response controller may be configured to receive the second response from the second device. Further, the response controller may be configured to generate a third tag query to identify the tag ID associated with the second response and a fourth tag query to identify the tag ID stored in the second table. The third tag query may include the third transaction ID and the device ID and the fourth tag query may include the device ID. Further, the response controller may be configured to provide the third and fourth tag queries to the table controller. The response controller may be further configured to receive, from the table controller, the tag ID having the second tag value as a response to both the third and fourth tag queries. The response controller may be further configured to compare the response to the third tag query with the response to the fourth tag query. Further, the response controller may be configured to provide the second response to the first device based on the response to the third tag query being same as the response to the fourth tag query.

In some embodiments, the table controller may be configured to receive the third tag query from the response controller and compare the third transaction ID and the device ID with each entry of the first plurality of entries. Based on the comparison of the third transaction ID and the device ID with each entry of the first plurality of entries, the table controller may be further configured to identify that the tag ID having the second tag value is associated with the second response. The table controller may be further configured to receive the fourth tag query from the response controller and compare the device ID with each entry of the second plurality of entries. Based on the comparison of the device ID with each entry of the second plurality of entries, the table controller may be further configured to identify that the tag ID having the second tag value is stored in the second table. Further, the table controller may be configured to provide, to the response controller, the tag ID having the second tag value as the response to both the third tag query and the fourth tag query.

Conventionally, when a fault is detected in a device, the faulty device is reset (e.g., a recovery operation for the fault) exclusively after all the ongoing transactions of the device are completed (e.g., responses associated with all the ongoing transactions are received and processed). As a result, a core circuit that performs the reset operation is required to wait for a significant amount of time to reset the faulty device, thereby degrading the performance (e.g., the availability) of the core circuit and increasing the latency for resetting the faulty device.

Various embodiments of the present disclosure disclose an integrated circuit that may include first and second devices and a transaction management system for managing multiple transactions between the first and second devices. The transaction management system may include a storage circuit and a processing circuit. The storage circuit may store a first table and a second table. When a transaction is initiated by the first device to be performed on the second device, the processing circuit may receive a request for the transaction. The request may include a transaction identifier (ID) of the transaction and a device ID of the first device that initiates the transaction. The processing circuit may store a mapping between the transaction ID, the device ID, and a tag ID of the first device in the first table. The second table, on the other hand, may store a mapping between the tag ID and the device ID. The tag ID in both the tables has a first tag value. Further, the processing circuit may provide the request to the second device.

The IC may further include a core circuit that may detect a fault in the first device and determine a reset of the first device as a recovery operation for the fault. The core circuit may further generate a reset query to determine an availability of the first device for reset. The processing circuit may receive the reset query from the core circuit after the request is provided to the second device. Based on the reset query, the processing circuit may update, in the second table, the tag ID from the first tag value to a second tag value. Further, in response to the reset query, the processing circuit may generate an acknowledgment indicating that the first device is available for reset and provide the acknowledgment to the core circuit. The first device may be reset by the core circuit upon receiving the acknowledgment. After the reset of the first device, the processing circuit may receive a response for the request from the second device. The processing circuit may identify that the tag ID having the first tag value is associated with the response and that the tag ID stored in the second table has the second tag value. Thus, the processing circuit may discard the received response based on the tag ID associated with the response being different from the tag ID stored in the second table.

The core circuit and the transaction management system of the present disclosure thus ensure that the faulty first device is recovered from the fault and the fault detected in the first device does not lead to an operational failure of the IC. Further, when the reset query is received from the core circuit, the tag ID in the second table is updated and the acknowledgment is immediately provided to the core circuit. In other words, the core circuit is not required to wait for the ongoing transactions to be completed for resetting the first device. Thus, utilization of the tag ID for the requests provided to the second device ensures that the reset of the first device is not delayed. As a result, the performance (e.g., the availability) of the core circuit of the present disclosure is significantly greater than that of core circuits that are required to wait for all ongoing transactions to be completed to reset a faulty device. Additionally, the latency for resetting a faulty device (e.g., the first device) in the present disclosure is significantly less than that where the faulty device is reset exclusively after all associated ongoing transactions are completed.

FIG. 1 illustrates a schematic block diagram of an integrated circuit (IC) 100 in accordance with an embodiment of the present disclosure. The IC 100 may include first and second devices 102a and 102b, a third device 104, a transaction management system 106, and a core circuit 108. The transaction management system 106 may include a storage circuit 110 that may be configured to store a first table 112 and a second table 114. The transaction management system 106 may further include a processing circuit 116. In an embodiment, the first and second devices 102a and 102b correspond to Advanced eXtensible Interface (AXI) master devices (e.g., a direct-memory-access controller, a processor, a math accelerator, or the like), and the third device 104 may correspond to an AXI slave device (e.g., a memory system, a packet classifier, or the like). The IC 100 may be included in data-intensive applications such as convolutional neural networking systems, advanced driver-assistance systems, wired/wireless networking systems, or the like.

The following table illustrates various signals and data described in FIG. 1:

| Signal/Data | Description |
| --- | --- |
| First request RQ1, second request RQ2, third request RQ3, and fourth request RQ4 | Transaction data required for performing the first transaction, the second transaction, the third transaction, and the fourth transaction on the third device 104, respectively |
| First response RE1, second response RE2, and third response RE3 | Responses generated based on the first transaction, the second transaction, and the fourth transaction being performed on the third device 104, respectively |
| First tag value TV1 and third tag value TV3 | Value of the tag ID of the first device 102a before and after the reset of the first device 102a, respectively |
| Second tag value TV2 | Value of the tag ID of the second device 102b before and after the reset of the first device 102a |
| First device ID DE1 and second device ID DE2 | Unique identifiers of the first and second devices 102a and 102b, respectively |
| First transaction ID TC1, second transaction ID TC2, third transaction ID TC3, and fourth transaction ID TC4 | Transaction identifiers of the first transaction, the second transaction, the third transaction, and the fourth transaction, respectively |
| Reset query RST | Generated to determine the availability of the first device 102a for reset |
| Reference tag value REF | Indicates the value to which the tag ID of the first device 102a is to be updated |
| Acknowledgment ACK | Indicates to the core circuit 108 that the first device 102a is available to be reset |

The first and second devices 102a and 102b may be coupled to the transaction management system 106, and may include suitable circuitry that may be configured to perform one or more operations. The first and second devices 102a and 102b may be configured to initiate various transactions to be performed on the third device 104. For example, the first device 102a may be configured to initiate a first transaction to be performed on the third device 104. Similarly, the second device 102b may be configured to initiate a second transaction to be performed on the third device 104. Additionally, the first device 102a may be configured to initiate, after the initiation of the first transaction, a third transaction and a fourth transaction to be performed on the third device 104. In one example, the first through fourth transactions correspond to read transactions for reading data stored in a memory (not shown) associated with the third device 104. In another example, the first through fourth transactions correspond to write transactions for writing data to the memory of the third device 104.

Before initiating the transactions, the first and second devices 102a and 102b may be configured to retrieve entry addresses of available entries of the first table 112. Further, the first and second devices 102a and 102b initiate the transactions such that the retrieved entry addresses are transaction identifiers (IDs) of the corresponding transactions.

Requests

The first and second devices 102a and 102b may be further configured to generate various requests for the initiated transactions. For example, the first and second devices 102a and 102b may be further configured to generate a first request RQ1 and a second request RQ2 for the first and second transactions, respectively. Similarly, the first device 102a may be configured to generate a third request RQ3 and a fourth request RQ4 for the third and fourth transactions, respectively. The first device 102a may be further configured to provide the first, third, and fourth requests RQ1, RQ3, and RQ4 to the transaction management system 106. Similarly, the second device 102b may be further configured to provide the second request RQ2 to the transaction management system 106.

Each request of the first through fourth requests RQ1-RQ4 may include a transaction ID of the corresponding transaction and a device ID of a device initiating the corresponding transaction. Thus, the first request RQ1 may include a first transaction ID TC1 of the first transaction and a first device ID DE1 of the first device 102a. The first transaction ID TC1 may correspond to an available entry address of the first table 112 and the first device ID DE1 may correspond to a unique ID of the first device 102a. Similarly, the second request RQ2 may include a second transaction ID TC2 of the second transaction and a second device ID DE2 of the second device 102b. Further, the third request RQ3 may include a third transaction ID TC3 of the third transaction and the first device ID DE1, and the fourth request RQ4 may include a fourth transaction ID TC4 of the fourth transaction and the first device ID DE1. Although not shown, the first through fourth requests RQ1-RQ4 may further include first through fourth addresses associated with the memory of the third device 104 where the first through fourth transactions are to be performed, respectively. Further, when the first through fourth transactions correspond to write transactions, each of the first through fourth requests RQ1-RQ4 may include write data. Each request of the first through fourth requests RQ1-RQ4 may further include other data required for performing the corresponding transaction.

Fault Detection and Recovery

Various faults may be detected in the first and second devices 102a and 102b when the first and second devices 102a and 102b are operational. For the sake of ongoing discussion, it is assumed that a fault is detected in the first device 102a during the operation of the first device 102a. To recover the first device 102a from the fault, a reset of the first device 102a may be required. It is further assumed that the first device 102a initiates the first and third transactions before the reset of the first device 102a and initiates the fourth transaction after the reset of the first device 102a. Further, the second device 102b initiates the second transaction before the reset of the first device 102a.

Responses

As the first and third transactions are initiated before the reset of the first device 102a, the first device 102a does not receive any response for the first and third requests RQ1 and RQ3. Further, as the fourth transaction is initiated after the reset of the first device 102a and as the reset of the first device 102a does not affect the operations of the second device 102b, the first and second devices 102a and 102b may be configured to process responses received for the fourth and second requests RQ4 and RQ2, respectively. In other words, the first and second devices 102a and 102b may be configured to perform various functional operations associated therewith based on the responses received for the fourth and second requests RQ4 and RQ2, respectively.

The third device 104 may correspond to a memory system that includes the memory and a memory controller (not shown). The memory controller of the third device 104 may be coupled to the memory and the transaction management system 106. The memory controller may be configured to receive various requests (e.g., the first request RQ1) from the transaction management system 106. Based on the first request RQ1, the memory controller may be further configured to perform the first transaction on the memory. When the first transaction corresponds to a read transaction, first data is read from the memory. Alternatively, when the first transaction corresponds to a write transaction, the first data is written to the memory. Based on the first transaction that is performed on the memory, the memory controller may be further configured to generate a first response RE1 that may include the first transaction ID TC1 and the first device ID DE1. Further, the first response RE1 may include either the first data that is read from the memory or a first write acknowledgment bit indicative of a successful write transaction. The memory controller may be further configured to provide the first response RE1 to the transaction management system 106. The third device 104 thus generates the first response RE1 for the first transaction that is performed on the third device 104, and provides the first response RE1 to the transaction management system 106.

The third device 104 may be further configured to generate a second response RE2 for the second request RQ2 based on the second transaction that is performed on the third device 104 and provide the second response RE2 to the transaction management system 106. The second response RE2 may thus include the second transaction ID TC2, the second device ID DE2, and one of second data read from the memory and a second write acknowledgment bit. Further, it is assumed that the first device 102a is reset while the third request RQ3 is at the transaction management system 106. Thus, the third request RQ3 is discarded by the transaction management system 106 (e.g., is not provided to the third device 104). Hence, there is no response for the third request RQ3. Further, the third device 104 may be configured to generate a third response RE3 for the fourth request RQ4 based on the fourth transaction that is performed on the third device 104 and provide the third response RE3 to the transaction management system 106. The third response RE3 may thus include the fourth transaction ID TC4, the first device ID DE1, and one of third data read from the memory and a third write acknowledgment bit.

The transaction management system 106 may be coupled to the first and second devices 102a and 102b, the third device 104, and the core circuit 108. The interface between the third device 104 and the transaction management system 106 may correspond to an AXI interface. The transaction management system 106 may be configured to receive various requests for transactions initiated by the first and second devices 102a and 102b. For example, the transaction management system 106 may be configured to receive the first, third, and fourth requests RQ1, RQ3, and RQ4 from the first device 102a, and the second request RQ2 from the second device 102b. The transaction management system 106 may receive the third request RQ3 after the first and second requests RQ1 and RQ2 are received and before the reception of the fourth request RQ4. Further, the second request RQ2 is received after the first request RQ1. In other words, the transaction management system 106 may receive the first through fourth requests RQ1-RQ4 in the following order: the first request RQ1, the second request RQ2, the third request RQ3, and the fourth request RQ4.

Reset of the First Device 102a

The transaction management system 106 may be configured to provide the first and second requests RQ1 and RQ2 to the third device 104. After the first and second requests RQ1 and RQ2 are provided to the third device 104, the transaction management system 106 may be further configured to receive a reset query RST and a reference tag value REF from the core circuit 108. The reset query RST may be received to determine an availability of the first device 102a for reset, and the reference tag value REF may facilitate the assessment of responses received from the third device 104. The transaction management system 106 may be further configured to generate an acknowledgment ACK for the reset query RST to indicate that the first device 102a is available for reset and provide the acknowledgment ACK to the core circuit 108. The first device 102a is reset by the core circuit 108 based on the acknowledgment ACK (e.g., upon receiving the acknowledgment ACK).

The transaction management system 106 may receive the reset query RST while the third request RQ3 is at the transaction management system 106 (e.g., before the third request RQ3 is provided to the third device 104). As the first device 102a is to be reset, the third request RQ3 (e.g., the third transaction) is no longer applicable for the first device 102a. Thus, the transaction management system 106 may be further configured to discard the third request RQ3. In other words, the third request RQ3 is not provided to the third device 104. Further, the transaction management system 106 may receive the fourth request RQ4 after the first device 102a is reset. In such a scenario, the transaction management system 106 may be further configured to provide the fourth request RQ4 to the third device 104.

Assessing Responses Received From the Third Device 104

In response to the first, second, and fourth requests RQ1, RQ2, and RQ4, the transaction management system 106 may be further configured to receive the first through third responses RQ1-RQ4 from the third device 104, respectively. The first through third responses RQ1-RQ4 are received after the reset of the first device 102a. As the first response RE1 is associated with the first transaction that is initiated before the reset of the first device 102a, the transaction management system 106 may be further configured to discard the first response RE1. In other words, the first response RE1 is not provided to the first device 102a.

The reset of the first device 102a does not affect the operations of the second device 102b. Thus, the transaction management system 106 may be further configured to provide the second response RE2 to the second device 102b. The second device 102b may be further configured to perform various functional operations associated therewith based on the second response RE2. As the third response RE3 is associated with the fourth transaction that is initiated after the reset of the first device 102a, the transaction management system 106 may be further configured to provide the third response RE3 to the first device 102a. The first device 102a may be further configured to perform various functional operations associated therewith based on the third response RE3.

The storage circuit 110 includes various flip-flops (not shown) that are configured to store the first table 112 and the second table 114. The first table 112 may include a first plurality of entries of which a first entry ET1, a second entry ET2, and a third entry ET3 are shown. The first plurality of entries has a plurality of entry addresses associated therewith, respectively. Each entry of the first table 112 includes a mapping between a transaction ID of a transaction and a device ID and a tag ID of a device initiating the corresponding transaction. In other words, the first table 112 includes three columns, namely, a "Transaction ID" column, a "Device ID" column, and a "Tag ID" column as illustrated in FIG. 1. The transaction ID and the device ID may be included in a request for the corresponding transaction and the tag ID is assigned by the transaction management system 106. Each AXI master device (e.g., the first and second devices 102a and 102b) of the IC 100 has a tag ID associated therewith. For each transaction initiated by an AXI master device, an associated tag ID is assigned to the transaction. The tag ID enables the determination of whether a response received for the transaction is valid or is to be discarded. The utilization of the tag ID for managing transactions is explained in detail later.

The storage circuit 110 may be configured to store a mapping between the first transaction ID TC1, the first device ID DE1, and a first tag ID of the first device 102a in the first entry ET1 (e.g., a first row) of the first table 112. The first tag ID has a first tag value TV1. Similarly, the storage circuit 110 may be configured to store a mapping between the second transaction ID TC2, the second device ID DE2, and a second tag ID of the second device 102b in the second entry ET2 (e.g., a second row) of the first table 112. The second tag ID has a second tag value TV2. Further, the storage circuit 110 may be configured to store a mapping between the fourth transaction ID TC4, the first device ID DE1, and the first tag ID in the third entry ET3 (e.g., the third row) of the first table 112. As the fourth transaction is initiated after the reset of the first device 102a, the first tag ID for the fourth transaction is different from that for the first transaction. In other words, the first tag ID is updated when the first device 102a is to be reset. Thus, the first tag ID included in the third entry ET3 has a third tag value TV3 that is different from the first tag value TV1. Transaction data (such as a transaction ID, a device ID, and a tag ID) may be stored in the first table 112 before providing the associated request to the third device 104. The first table 112 thus does not include transaction data associated with the third transaction as the third request RQ3 is discarded.

The second table 114 has a second plurality of entries of which a fourth entry ET4 and a fifth entry ET5 are shown. Each entry of the second table 114 includes a mapping between a device ID and a tag ID of a device. In other words, the second table 114 includes two columns, namely, a "Device ID" column and a "Tag ID" column as illustrated in FIG. 1. A current tag value of the tag ID is stored in the second table 114. For example, the storage circuit 110 may be configured to store a mapping between the first device ID DE1 and the first tag ID of the first device 102a in the fourth entry ET4 of the second table 114. The first tag ID in the second table 114 has the first tag value TV1 before the reset of the first device 102a, and the third tag value TV3 after the reset of the first device 102a. Further, the storage circuit 110 may be configured to store a mapping between the second device ID DE2 and the second tag ID of the second device 102b in the fifth entry ET5 of the second table 114. The second tag ID has the second tag value TV2 and remains unchanged as the second device 102b is not reset. The tag values of various tag IDs in the second table 114 may be initialized during a boot operation of the IC 100.

The processing circuit 116 may be coupled to the storage circuit 110, the first and second devices 102a and 102b, the core circuit 108, and the third device 104. The processing circuit 116 may include suitable circuitry that may be configured to perform one or more operations.

First Request RQ1

The processing circuit 116 may be configured to receive the first request RQ1 for the first transaction from the first device 102a when the first transaction is initiated by the first device 102a. The first request RQ1 is received before the reset of the first device 102a. The processing circuit 116 may be further configured to compare the first device ID DE1 with each entry of the second table 114 and retrieve the first tag ID from the second table 114 based on the comparison of the first device ID DE1 with each entry of the second table 114. The processing circuit 116 may thus retrieve the first tag ID from the second table 114 based on the first device ID DE1 included in the first request RQ1. The first tag ID has the first tag value TV1 before the reset of the first device 102a. The first tag ID having the first tag value TV1 may be pre-stored in the second table 114 or may be updated based on a previous reset of the first device 102a. The processing circuit 116 may be further configured to store, in the first entry ET1 of the first table 112, the mapping between the first transaction ID TC1, the first device ID DE1, and the first tag ID having the first tag value TV1. In other words, the first tag value TV1 is assigned to the first transaction. Further, the processing circuit 116 may be configured to provide the first request RQ1 to the third device 104.

Second Request RQ2

The processing circuit 116 may be similarly configured to receive the second request RQ2 for the second transaction from the second device 102b. The processing circuit 116 may be further configured to compare the second device ID DE2 included in the second request RQ2 with each entry of the second table 114 and retrieve the second tag ID from the second table 114 based on the comparison of the second device ID DE2 with each entry of the second table 114. The retrieved second tag ID has the second tag value TV2. The second tag ID having the second tag value TV2 may be pre-stored in the second table 114 or may be updated based on a previous reset of the second device 102b. The processing circuit 116 may be further configured to store, in the second entry ET2 of the first table 112, the mapping between the second transaction ID TC2, the second device ID DE2, and the second tag ID having the second tag value TV2. In other words, the second tag value TV2 is assigned to the second transaction. Further, the processing circuit 116 may be configured to provide the second request RQ2 to the third device 104.

Third Request RQ3 and Reset of the First Device 102a

The processing circuit 116 may be further configured to receive the third request RQ3 for the third transaction from the first device 102a. After the third request RQ3 is received, the processing circuit 116 may be further configured to receive the reset query RST and the reference tag value REF from the core circuit 108. The reset query RST is thus received after the first and second requests RQ1 and RQ2 are provided to the third device 104, and while the third request RQ3 is at the processing circuit 116. The reset query RST may be generated to determine the availability of the first device 102a for reset. The reference tag value REF may correspond to the updated tag value of the first tag ID (e.g., the third tag value TV3).

Based on the reset query RST and the reference tag value REF, the processing circuit 116 may be further configured to update, in the second table 114, the first tag ID from the first tag value TV1 to the third tag value TV3. Further, the processing circuit 116 may be configured to generate the acknowledgment ACK for the reset query RST to indicate that the first device 102a is available for reset and provide the acknowledgment ACK to the core circuit 108. The first device 102a may be reset based on the acknowledgment ACK. As the reset query RST is received before the third request RQ3 is provided to the third device 104, the processing circuit 116 may be further configured to discard the third request RQ3.

Fourth Request RQ4

After the reset of the first device 102a, the processing circuit 116 may be further configured to receive the fourth request RQ4 for the fourth transaction from the first device 102a. The processing circuit 116 may be further configured to compare the first device ID DE1 included in the fourth request RQ4 with each entry of the second table 114 and retrieve the first tag ID from the second table 114 based on the comparison of the first device ID DE1 with each entry of the second table 114. At such a time instance, the first tag ID has the third tag value TV3. The processing circuit 116 may be further configured to store, in the third entry ET3 of the first table 112, the mapping between the fourth transaction ID TC4, the first device ID DE1, and the first tag ID having the third tag value TV3. In other words, the third tag value TV3 is assigned to the third transaction. Further, the processing circuit 116 may be configured to provide the fourth request RQ4 to the third device 104.

First Response RE1

The processing circuit 116 may be further configured to receive, from the third device 104, the first response RE1 for the first request RQ1. The first response RE1 may be received after the reset of the first device 102a. The processing circuit 116 may be further configured to compare the first transaction ID TC1 and the first device ID DE1 included in the first response RE1 with each entry of the first table 112 (e.g., the first plurality of entries). Based on the comparison of the first transaction ID TC1 and the first device ID DE1 with each entry of the first table 112, the processing circuit 116 may be further configured to identify that the first tag ID having the first tag value TV1 is associated with the first response RE1. Thus, the processing circuit 116 identifies that the first tag ID having the first tag value TV1 is associated with the first response RE1 based on the first transaction ID TC1 and the first device ID DE1 included in the first response RE1 and the mappings stored in the first table 112. The processing circuit 116 may be further configured to compare the first device ID DE1 included in the first response RE1 with each entry of the second table 114 (e.g., the second plurality of entries). Based on the comparison of the first device ID DE1 with each entry of the second table 114, the processing circuit 116 may be further configured to identify that the third tag value TV3 is the current tag value of the first tag ID. In other words, the processing circuit 116 may identify that the first tag ID having the third tag value TV3 is stored in the second table 114.

The processing circuit 116 may be further configured to compare the first tag ID associated with the first response RE1 with the first tag ID stored in the second table 114. The first response RE1 is associated with the first transaction that is initiated before the reset of the first device 102a. Hence, the first tag ID associated with the first response RE1 is different from the first tag ID currently stored in the second table 114 (e.g., when the first response RE1 is received). The processing circuit 116 may be further configured to discard the first response RE1 based on the first tag ID associated with the first response RE1 being different from the first tag ID stored in the second table 114. When the first device 102a is reset, the first transaction is rendered invalid. In such a scenario, if the first response RE1 is to be provided to the first device 102a, the first device 102a may be required to record information associated with the ongoing transactions (e.g., the first transaction) at the time of the reset and discard responses (e.g., the first response RE1) received for such transactions after the reset based on the recorded information. As a result, the performance (e.g., the availability) of the first device 102a may degrade. Additionally, the resetting of the first device 102a may be delayed. In the present disclosure, the first response RE1 is discarded by the processing circuit 116 (e.g., is not provided to the first device 102a), thereby eliminating a need for the first device 102a to discard such responses and increasing the performance (e.g., the availability) of the first device 102a. Additionally, a delay is not introduced in resetting of the first device 102a. Further, the processing circuit 116 may be configured to delete the first entry ET1 of the first table 112 after the first response RE1 is discarded.

Second Response RE2

The processing circuit 116 may be further configured to receive, from the third device 104, the second response RE2 for the second request RQ2. The second response RE2 may be received after the reset of the first device 102a. The processing circuit 116 may be further configured to compare the second transaction ID TC2 and the second device ID DE2 included in the second response RE2 with each entry of the first table 112. Based on the comparison of the second transaction ID TC2 and the second device ID DE2 with each entry of the first table 112, the processing circuit 116 may be further configured to identify that the second tag ID having the second tag value TV2 is associated with the second response RE2. The processing circuit 116 may be further configured to compare the second device ID DE2 included in the second response RE2 with each entry of the second table 114. Based on the comparison of the second device ID DE2 with each entry of the second table 114, the processing circuit 116 may be further configured to identify that the second tag value TV2 is the current tag value of the second tag ID.

The processing circuit 116 may be further configured to compare the second tag ID associated with the second response RE2 with the second tag ID stored in the second table 114. As the second response RE2 is associated with the second device 102b and as the reset of the first device 102a does not affect the operation of the second device 102b, the second tag ID associated with the second response RE2 is same as the second tag ID stored in the second table 114. As a result, the processing circuit 116 may be further configured to provide the second response RE2 to the second device 102b. Further, the processing circuit 116 may be configured to delete the second entry ET2 of the first table 112 after the second response RE2 is provided to the second device 102b.

Third Response RE3

The processing circuit 116 may be similarly configured to receive, from the third device 104, the third response RE3 for the fourth request RQ4. The third response RE3 may be received after the reset of the first device 102a. The processing circuit 116 may be further configured to compare the fourth transaction ID TC4 and the first device ID DE1 included in the third response RE3 with each entry of the first table 112 (e.g., the first plurality of entries). Based on the comparison of the fourth transaction ID TC4 and the first device ID DE1 with each entry of the first table 112, the processing circuit 116 may be further configured to identify that the first tag ID having the third tag value TV3 is associated with the third response RE3. The processing circuit 116 may be further configured to compare the first device ID DE1 included in the third response RE3 with each entry of the second table 114 (e.g., the second plurality of entries). Based on the comparison of the first device ID DE1 with each entry of the second table 114, the processing circuit 116 may be further configured to identify that the third tag value TV3 is the current tag value of the first tag ID. In other words, the processing circuit 116 may identify that the first tag ID having the third tag value TV3 is stored in the second table 114.

The processing circuit 116 may be further configured to compare the first tag ID associated with the third response RE3 with the first tag ID stored in the second table 114. As the third response RE3 is associated with the fourth transaction that is initiated after the reset of the first device 102a, the first tag ID associated with the third response RE3 is same as the first tag ID currently stored in the second table 114. The processing circuit 116 may be further configured to provide the third response RE3 to the first device 102a based on the first tag ID associated with the third response RE3 being same as the first tag ID stored in the second table 114. Further, the processing circuit 116 may be configured to delete the third entry ET3 of the first table 112 after the third response RE3 is provided to the first device 102a.

Although not shown, the transaction management system 106 may further include a controller that may be coupled between the processing circuit 116 and the third device 104 and facilitate communication therebetween. In an embodiment, the controller may correspond to an AXI controller.

The core circuit 108 may be coupled to the processing circuit 116. The core circuit 108 may include suitable circuitry that may be configured to perform one or more operations. For example, the core circuit 108 may be configured to detect the fault in the first device 102a and determine a recovery operation to recover the first device 102a from the fault. It is assumed that the recovery operation corresponds to the reset of the first device 102a. In other words, the core circuit 108 may determine that the first device 102a is to be reset to recover the first device 102a from the fault. Further, the core circuit 108 may be configured to generate the reset query RST to determine the availability of the first device 102a for reset. The core circuit 108 may be further configured to generate the reference tag value REF that may correspond to the third tag value TV3 (e.g., the value to which the first tag ID in the second table 114 is to be updated). Further, the core circuit 108 may be configured to provide the reset query RST and the reference tag value REF to the processing circuit 116. In response to the reset query RST, the core circuit 108 may be further configured to receive the acknowledgment ACK from the processing circuit 116. Based on the acknowledgment ACK, the core circuit 108 may be further configured to reset the first device 102a.

The inclusion of the tag IDs (such as the first and second tag IDs) in the first and second tables 112 and 114 thus ensures that when the first device 102a is to be reset, the core circuit 108 is not required to wait for all the ongoing transactions of the first device 102a to be completed. The first device 102a may be reset immediately and when responses for transactions that are initiated by the first device 102a before the reset are received, such responses are discarded based on the tag IDs included in the first and second tables 112 and 114.

Variations in the IC 100 of FIG. 1

In a first variation, the IC 100 may include more than one AXI slave device, and more than two AXI master devices communicating with each AXI slave device instead of including two AXI master devices (e.g., the first and second devices 102a and 102b) and one AXI slave device (e.g., the third device 104).

In a second variation, the first device 102a, the second device 102b, and the third device 104 may adhere to a protocol that is different from the AXI protocol. Examples of such protocols may include Advanced High-performance Bus (AHB) protocol, the Advanced System Bus (ASB) protocol, or the like.

In a third variation, the first device 102a may initiate more than three transactions and the second device 102b may initiate more than one transaction. When the first device 102a initiates multiple transactions, responses associated with transactions that are initiated before the first device 102a is reset may be received after the reset of the first device 102a. Such responses are discarded. Further, when the reset query RST is received, the requests that are at the transaction management system 106 (e.g., that are yet to be provided to the third device 104) are discarded. Additionally, the transactions initiated after the reset of the first device 102a have an updated tag value associated therewith, and hence, and are completed. Multiple transactions initiated by the second device 102b may be managed in a similar manner as described above.

In a fourth variation, the fault may be detected in the second device 102b in addition to the first device 102a. In such a scenario, the reset query RST may be generated to determine the availability of the first and second devices 102*a* and 102*b* for reset. Further, the transactions initiated by the second device 102*b* may be managed in a similar manner as the transactions initiated by the first device 102*a* are managed.

In a fifth variation, the transaction management system 106 may additionally include a reset register (not shown) for each AXI master device. Further, the core circuit 108 may store a reset bit in an activated state in the reset register associated with the first device 102*a* for indicating that the first device 102*a* is to be reset and for determining the availability of the first device 102*a* for reset, instead of providing the reset query RST to the processing circuit 116.

In a sixth variation, the core circuit 108 may not provide the reference tag value REF to the processing circuit 116, and the processing circuit 116 may update the first tag ID from the first tag value TV1 to the third tag value TV3 based on a predefined set of rules associated with the processing circuit 116.

Figure 2:
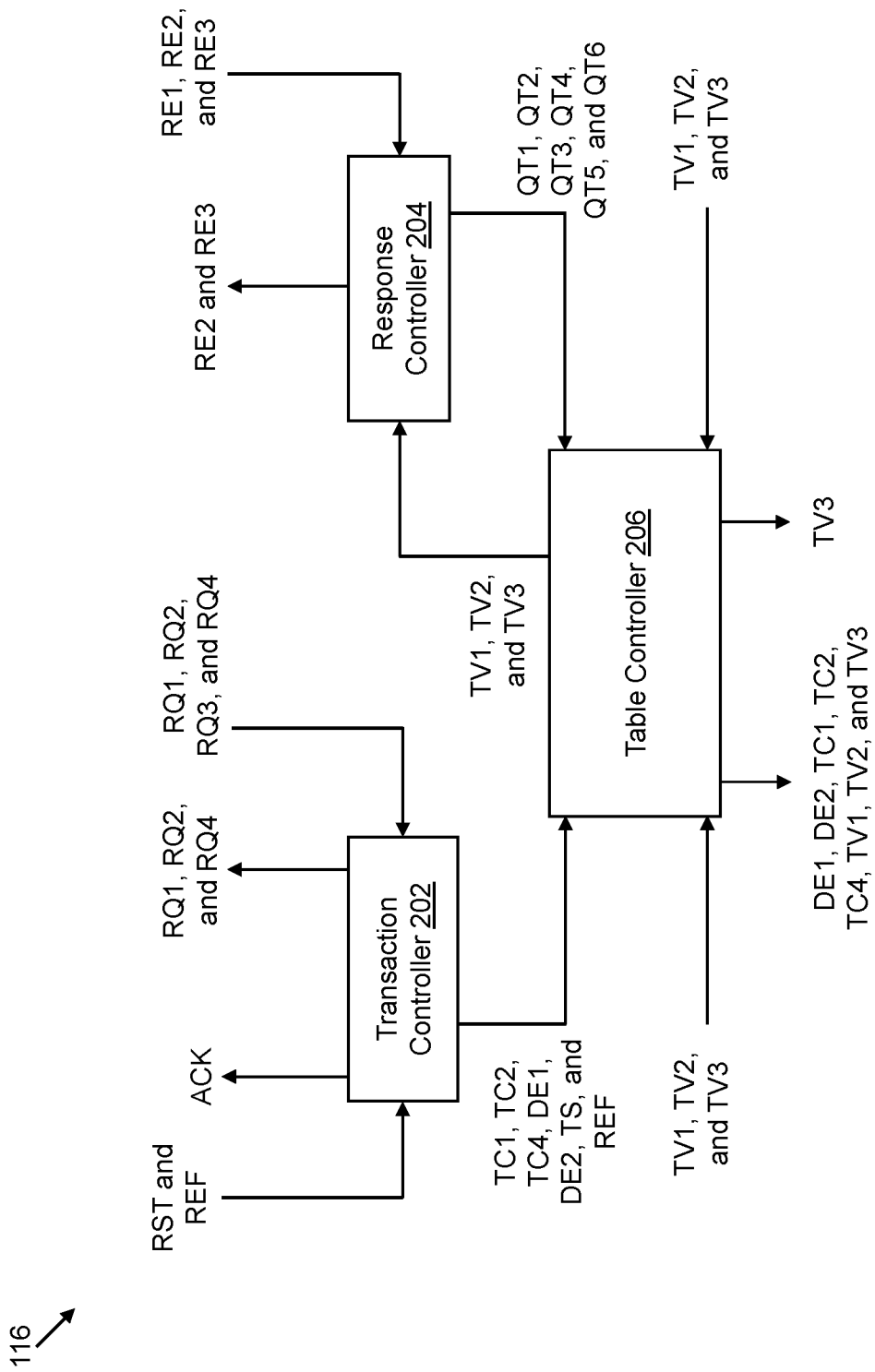
FIG. 2 illustrates a schematic block diagram of a processing circuit of the IC of FIG. 1 in accordance with an embodiment of the present disclosure.

FIG. 2 illustrates a schematic block diagram of the processing circuit 116 in accordance with an embodiment of the present disclosure. The processing circuit 116 may include a transaction controller 202, a response controller 204, and a table controller 206.

The following table illustrates various signals and data described in FIG. 2:

| Signal/Data | Description |
| --- | --- |
| First tag query QT1 | Generated for identifying a tag value associated with the first response RE1 |
| Second tag query QT2 | Generated for identifying a current tag value of the first tag ID |
| Third tag query QT3 | Generated for identifying a tag value associated with the second response RE2 |
| Fourth tag query QT4 | Generated for identifying a current tag value of the second tag ID |
| Fifth tag query QT5 | Generated for identifying a tag value associated with the third response RE3 |
| Sixth tag query QT6 | Generated for identifying a current tag value of the first tag ID |
| Trigger signal TS | Indicates that the first tag ID in the second table 114 is to be updated |

The transaction controller 202 may be coupled to the first and second devices 102*a* and 102*b*, the third device 104, the core circuit 108, and the table controller 206. The transaction controller 202 may include suitable circuitry that may be configured to perform one or more operations. For example, the transaction controller 202 may be configured to receive the first, third, and fourth requests RQ1, RQ3, and RQ4 from the first device 102*a*. Similarly, the transaction controller 202 may be configured to receive the second request RQ2 from the second device 102*b*.

First and Second Requests RQ1 and RQ2

The transaction controller 202 may receive the first and second requests RQ1 and RQ2 from the first and second devices 102*a* and 102*b*, respectively, in a sequential manner. When the first request RQ1 is received, the transaction controller 202 may be further configured to provide the first transaction ID TC1 and the first device ID DE1 included in the first request RQ1 to the table controller 206. Further, the transaction controller 202 may be configured to provide the first request RQ1 to the third device 104. Similarly, when the second request RQ2 is received, the transaction controller 202 may be further configured to provide the second transaction ID TC2 and the second device ID DE2 included in the second request RQ2 to the table controller 206. Further, the transaction controller 202 may be configured to provide the second request RQ2 to the third device 104. The first and second device IDs DE1 and DE2 are unique. Further, the first and second transaction IDs TC1 and TC2 may be same or different.

Third Request RQ3 and Reset of the First Device 102*a*

When the fault is detected in the first device 102*a*, the transaction controller 202 may be further configured to receive the reset query RST and the reference tag value REF from the core circuit 108. Based on the reset query RST, the transaction controller 202 may be further configured to generate a trigger signal TS indicating that the first tag ID in the second table 114 is to be updated, and provide the trigger signal TS to the table controller 206. The transaction controller 202 may be further configured to provide the reference tag value REF to the table controller 206. Further, the transaction controller 202 may be configured to generate the acknowledgment ACK for the reset query RST and provide the acknowledgment ACK to the core circuit 108. The first device 102*a* is reset based on the acknowledgment ACK.

It is assumed that the transaction controller 202 receives the first through third requests RQ1-RQ3 before the reception of the reset query RST, and the fourth request RQ4 after the reception of the reset query RST. Thus, as the reset query RST is received while the third request RQ3 is at the transaction controller 202 (e.g., before the third request RQ3 is provided to the third device 104), the transaction controller 202 may be further configured to discard the third request RQ3.

Fourth Request RQ4

When the fourth request RQ4 is received after the reset of the first device 102*a*, the transaction controller 202 may be further configured to provide the fourth transaction ID TC4 and the first device ID DE1 included in the fourth request RQ4 to the table controller 206. The fourth transaction ID TC4 may be same as the first through third transaction IDs TC1-TC3 or the first through fourth transaction IDs TC1-TC4 may be different. Further, the transaction controller 202 may be configured to provide the fourth request RQ4 to the third device 104.

The response controller 204 may be coupled to the first and second devices 102*a* and 102*b*, the third device 104, and the table controller 206. The response controller 204 may include suitable circuitry that may be configured to perform one or more operations.

First Response RE1

The response controller 204 may be configured to receive the first response RE1 for the first request RQ1 from the third device 104. The first response RE1 may be received after the reset of the first device 102*a*. Further, to identify the first tag ID (e.g., a tag value of the first tag ID) associated with the first response RE1, the response controller 204 may be configured to generate a first tag query QT1. The first tag query QT1 may include the first transaction ID TC1 and the first device ID DE1 that are included in the first response RE1. Similarly, to identify a tag value of the first tag ID stored in the second table 114, the response controller 204 may be further configured to generate a second tag query QT2 that may include the first device ID DE1. The response controller 204 may be further configured to provide the first and second tag queries QT1 and QT2 to the table controller 206. Further, the response controller 204 may be configured to receive, from the table controller 206, the first tag ID having the first tag value TV1 as a response to the first tag query QT1 and the first tag ID having the third tag value TV3 as a response to the second tag query QT2. The response controller 204 may be further configured to compare the response to the first tag query QT1 with the response to the second tag query QT2 and discard the first response RE1 based on the mismatch between the first tag ID associated with the first response RE1 and the first tag ID stored in the second table 114.

Second Response RE2

The response controller 204 may be further configured to receive the second response RE2 for the second request RQ2 from the third device 104. The second response RE2 may be received after the reset of the first device 102a. To identify the second tag ID (e.g., a tag value of the second tag ID) associated with the second response RE2, the response controller 204 may be configured to generate a third tag query QT3 that may include the second transaction ID TC2 and the second device ID DE2 included in the second response RE2. Similarly, to identify a tag value of the second tag ID stored in the second table 114, the response controller 204 may be further configured to generate a fourth tag query QT4 that may include the second device ID DE2. The response controller 204 may be further configured to provide the third and fourth tag queries QT3 and QT4 to the table controller 206. Further, the response controller 204 may be configured to receive, from the table controller 206, the second tag ID having the second tag value TV2 as a response to both the third and fourth tag queries QT3 and QT4. The response controller 204 may be further configured to compare the response to the third tag query QT3 with the response to the fourth tag query QT4. Further, the response controller 204 may be configured to provide the second response RE2 to the second device 102b based on the second tag ID associated with the second response RE2 being same as the second tag ID stored in the second table 114.

Third Response RE3

The response controller 204 may be further configured to receive the third response RE3 for the fourth request RQ4 from the third device 104 after the reset of the first device 102a. The response controller 204 may be further configured to generate a fifth tag query QT5 to identify the first tag ID (e.g., a tag value of the first tag ID) associated with the third response RE3 and a sixth tag query QT6 to identify a tag value of the first tag ID stored in the second table 114. The fifth tag query QT5 may include the fourth transaction ID TC4 and the first device ID DE1 that are included in the third response RE3. Similarly, the sixth tag query QT6 may include the first device ID DE1. The response controller 204 may be further configured to provide the fifth and sixth tag queries QT5 and QT6 to the table controller 206. Further, the response controller 204 may be configured to receive, from the table controller 206, the first tag ID having the third tag value TV3 as a response to both the fifth and sixth tag queries QT5 and QT6. The response controller 204 may be further configured to compare the response to the fifth tag query QT5 with the response to the sixth tag query QT6. Further, the response controller 204 may be configured to provide the third response RE3 to the first device 102a based on the first tag ID associated with the third response RE3 being same as the first tag ID stored in the second table 114 (e.g., the current tag value of the first tag ID).

The table controller 206 may be coupled to the transaction controller 202, the response controller 204, and the storage circuit 110 (e.g., the first and second tables 112 and 114). The table controller 206 may include suitable circuitry that may be configured to perform one or more operations.

First Transaction

For the first transaction, the table controller 206 may be configured to receive the first transaction ID TC1 and the first device ID DE1 from the transaction controller 202. Further, the table controller 206 may be configured to retrieve, based on the first device ID DE1, the first tag ID having the first tag value TV1 from the second table 114. The first tag ID stored in the second table 114 has the first tag value TV1 as the first transaction is initiated before the reset of the first device 102a. To retrieve the first tag ID having the first tag value TV1 from the second table 114, the table controller 206 may be further configured to compare the first device ID DE1 with each entry of the second table 114. Further, the table controller 206 may be configured to store, in the first entry ET1 of the first table 112, the mapping between the first transaction ID TC1, the first device ID DE1, and the first tag ID having the first tag value TV1.

Second Transaction

The table controller 206 may be similarly configured to receive the second transaction ID TC2 and the second device ID DE2 from the transaction controller 202 for the second transaction. Further, the table controller 206 may be configured to compare the second device ID DE2 with each entry of the second table 114 and retrieve the second tag ID having the second tag value TV2 from the second table 114. The table controller 206 may be further configured to store, in the second entry ET2 of the first table 112, the mapping between the second transaction ID TC2, the second device ID DE2, and the second tag ID having the second tag value TV2.

Tag ID Update

When the fault is detected in the first device 102a, the table controller 206 may be further configured to receive the trigger signal TS from the transaction controller 202. The trigger signal TS may indicate that the first tag ID in the second table 114 is to be updated. The table controller 206 may be further configured to receive the reference tag value REF from the transaction controller 202. Based on the trigger signal TS and the reference tag value REF, the table controller 206 may be further configured to update the first tag ID from the first tag value TV1 to the third tag value TV3 in the second table 114. In an example, the first tag value TV1 is "0001" and the third tag value TV3 is "0101".

Although it described that the table controller 206 receives the reference tag value REF indicating that the first tag value TV1 is to be updated to the third tag value TV3, the scope of the present disclosure is not limited to it. In various other embodiments, when the fault is detected in the first device 102a (e.g., when the reset query RST is received by the transaction management system 106), the table controller 206 may receive exclusively the trigger signal TS. In other words, the table controller 206 may not receive the reference tag value REF. In such a scenario, the table controller 206 may update the first tag ID based on the predefined set of rules. In an example, the update of the first tag ID may correspond to incrementation by one. Thus, if the first tag value TV1 is "0001", the third tag value TV3 may be "0010". Fourth transaction:

For the fourth transaction, the table controller 206 may be further configured to receive the fourth transaction ID TC4 and the first device ID DE1 from the transaction controller 202. Further, the table controller 206 may be configured to compare the first device ID DE1 with each entry of the second table 114 and retrieve the first tag ID having the third tag value TV3 from the second table 114. The first tag ID stored in the second table 114 has the third tag value TV3 as the fourth transaction is initiated after the reset of the first device 102a. The table controller 206 may be further configured to store, in the third entry ET3 of the first table 112, the mapping between the fourth transaction ID TC4, the first device ID DE1, and the first tag ID having the third tag value TV3.

First Response RE1

When the transaction management system 106 receives the first response RE1 from the third device 104, the table controller 206 may be further configured to receive the first and second tag queries QT1 and QT2 from the response controller 204. The first tag query QT1 includes the first transaction ID TC1 and the first device ID DE1. The table controller 206 may be further configured to compare the first transaction ID TC1 and the first device ID DE1 with each entry of the first table 112 (e.g., the first plurality of entries). Based on the comparison of the first transaction ID TC1 and the first device ID DE1 with each entry of the first table 112, the table controller 206 may be configured to identify that the first tag ID having the first tag value TV1 is associated with the first response RE1. The table controller 206 may be further configured to provide, to the response controller 204, the first tag ID having the first tag value TV1 as the response to the first tag query QT1. Similarly, the second tag query QT2 includes the first device ID DE1. The table controller 206 may be further configured to compare the first device ID DE1 with each entry of the second table 114 (e.g., the second plurality of entries). Based on the comparison of the first device ID DE1 with each entry of the second table 114, the table controller 206 may be further configured to identify that the third tag value TV3 is the tag value of the first tag ID stored in the second table 114. Further, the table controller 206 may be configured to provide, to the response controller 204, the first tag ID having the third tag value TV3 as the response to the second tag query QT2. Further, the table controller 206 may be configured to delete the first entry ET1 of the first table 112.

Second Response RE2

The table controller 206 may similarly receive the third and fourth tag queries QT3 and QT4 from the response controller 204 when the second response RE2 is received by the transaction management system 106 from the third device 104. The table controller 206 may be further configured to compare the second transaction ID TC2 and the second device ID DE2 included in the third tag query QT3 with each entry of the first table 112 (e.g., the first plurality of entries), and identify that the second tag ID having the second tag value TV2 is associated with the second response RE2. The table controller 206 may be further configured to provide, to the response controller 204, the second tag ID having the second tag value TV2 as the response to the third tag query QT3. Similarly, the table controller 206 may be further configured to compare the second device ID DE2 included in the fourth tag query QT4 with each entry of the second table 114 (e.g., the second plurality of entries), and identify that the second tag value TV2 is the tag value of the second tag ID stored in the second table 114. Further, the table controller 206 may be configured to provide, to the response controller 204, the second tag ID having the second tag value TV2 as the response to the fourth tag query QT4. Further, the table controller 206 may be configured to delete the second entry ET2 of the first table 112.

Third Response RE3

When the transaction management system 106 receives the third response RE3 from the third device 104, the table controller 206 may be further configured to receive the fifth and sixth tag queries QT5 and QT6 from the response controller 204. The table controller 206 may be further configured to compare the fourth transaction ID TC4 and the first device ID DE1 included in the fifth tag query QT5 with each entry of the first table 112 (e.g., the first plurality of entries). Based on the comparison of the fourth transaction ID TC4 and the first device ID DE1 with each entry of the first table 112, the table controller 206 may be further configured to identify that the first tag ID having the third tag value TV3 is associated with the third response RE3. Similarly, the table controller 206 may be further configured to compare the first device ID DE1 included in the sixth tag query QT6 with each entry of the second table 114 (e.g., the second plurality of entries). Based on the comparison of the first device ID DE1 with each entry of the second table 114, the table controller 206 may be further configured to identify that the third tag value TV3 is the tag value of the first tag ID stored in the second table 114. The table controller 206 may be further configured to provide, to the response controller 204, the first tag ID having the third tag value TV3 as the response to both the fifth and sixth tag queries QT5 and QT6. Further, the table controller 206 may be configured to delete the third entry ET3 of the first table 112.

FIGS. 3A-3D, collectively, represents a flowchart 300 that illustrates a transaction management method for managing transactions in the IC 100 in accordance with an embodiment of the present disclosure. The first device 102a may initiate the first, third, and fourth transactions to be performed on the third device 104 and generate the first, third, and fourth requests RQ1, RQ3, and RQ4, respectively. Similarly, the second device 102b may initiate the second transaction to be performed on the third device 104 and generate the second request RQ2.

Figure 3A:
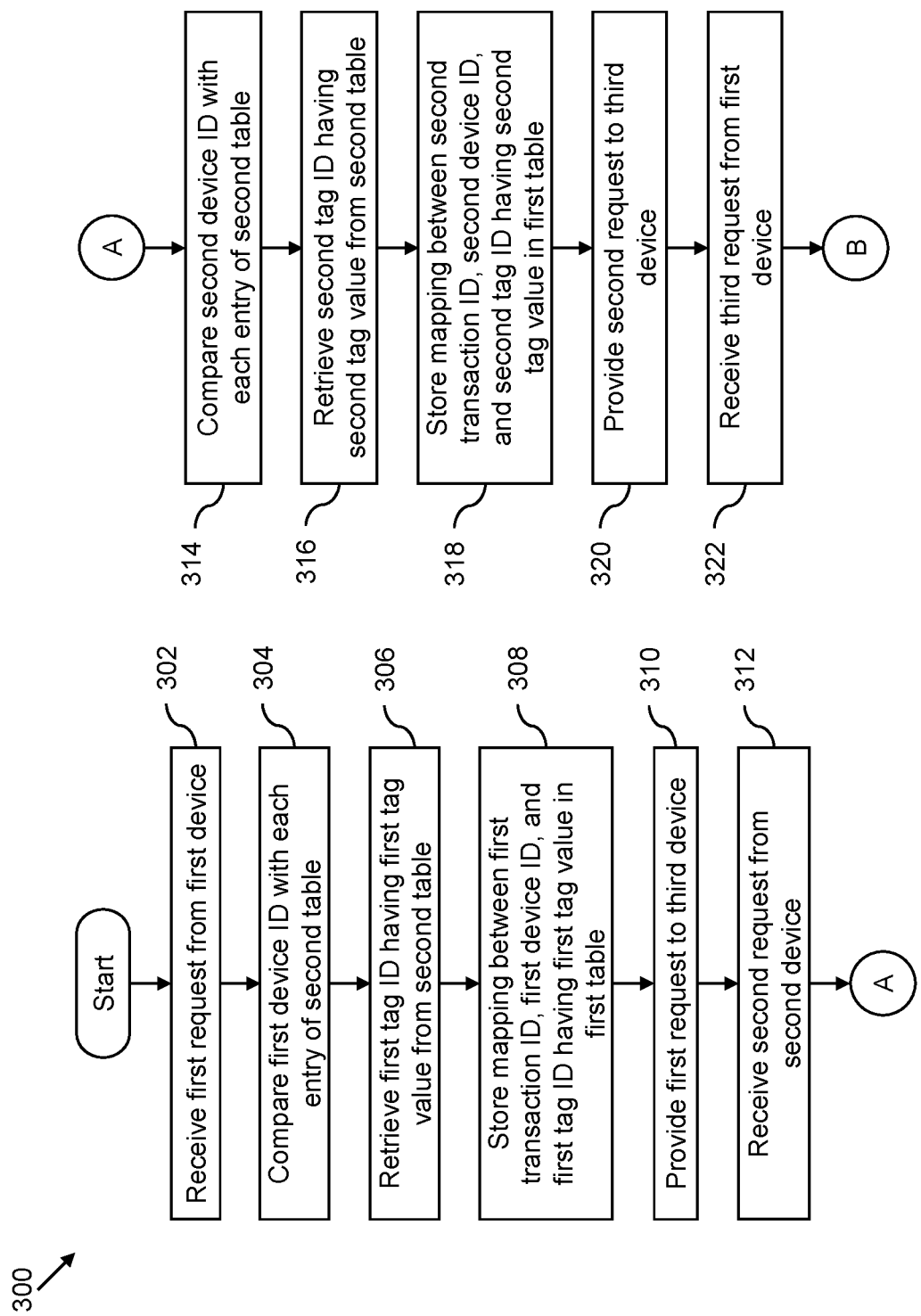
FIGS. 3A-3D, collectively, represents a flowchart that illustrates a transaction management method for managing transactions in the IC of FIG. 1 in accordance with an embodiment of the present disclosure.

Referring now to FIG. 3A, at step 302, the processing circuit 116 may receive the first request RQ1 from the first device 102a. The first request RQ1 may include the first transaction ID TC1 of the first transaction and the first device ID DE1 of the first device 102a. The first request RQ1 may further include other transaction data (such as the first address). At step 304, the processing circuit 116 may compare the first device ID DE1 with each entry of the second table 114. At step 306, the processing circuit 116 may retrieve the first tag ID having the first tag value TV1 from the second table 114 based on the comparison of the first device ID DE1 with each entry of the second table 114. At step 308, the processing circuit 116 may store the mapping between the first transaction ID TC1, the first device ID DE1, and the first tag ID having the first tag value TV1 in the first entry ET1 of the first table 112. At step 310, the processing circuit 116 may provide the first request RQ1 to the third device 104.

At step 312, the processing circuit 116 may receive the second request RQ2 from the second device 102b. The second request RQ2 may include the second transaction ID TC2 of the second transaction and the second device ID DE2 of the second device 102b. The second request RQ2 may further include other transaction data (such as the second address). At step 314, the processing circuit 116 may compare the second device ID DE2 with each entry of the second table 114. At step 316, the processing circuit 116 may retrieve the second tag ID having the second tag value TV2 from the second table 114 based on the comparison of the second device ID DE2 with each entry of the second table 114. At step 318, the processing circuit 116 may store the mapping between the second transaction ID TC2, the second device ID DE2, and the second tag ID having the second tag value TV2 in the second entry ET2 of the first table 112. At step 320, the processing circuit 116 may provide the second request RQ2 to the third device 104.

At step 322, the processing circuit 116 may receive the third request RQ3 from the first device 102a. The third request RQ3 may include the third transaction ID TC3 of the third transaction and the first device ID DE1 of the first device 102a. The third request RQ3 may further include other transaction data (such as the third address).

Figure 3B:
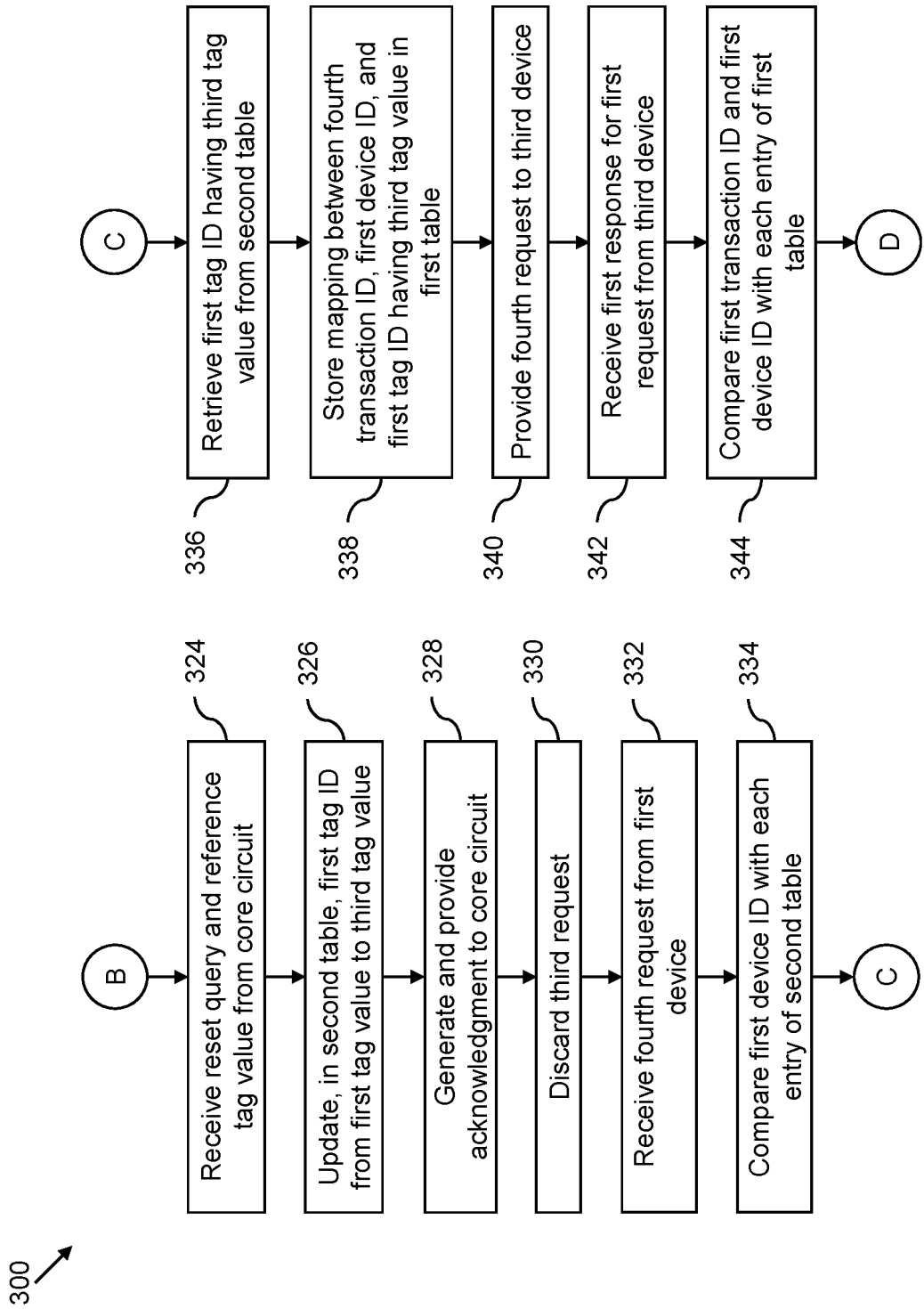

Referring now to FIG. 3B, at step 324, the processing circuit 116 may receive the reset query RST and the reference tag value REF from the core circuit 108. At step 326, the processing circuit 116 may update, in the second table 114, the first tag ID from the first tag value TV1 to the third tag value TV3. At step 328, the processing circuit 116 may generate and provide the acknowledgment ACK to the core circuit 108 as the response to the reset query RST. The acknowledgment ACK indicates that the first device 102a is available for reset. At step 330, the processing circuit 116 may discard the third request RQ3 as the reset query RST is received while the third request RQ3 is at the processing circuit 116 (e.g., before the third request RQ3 is provided to the third device 104).

At step 332, the processing circuit 116 may receive the fourth request RQ4 from the first device 102a. The fourth request RQ4 may include the fourth transaction ID TC4 of the fourth transaction and the first device ID DE1 of the first device 102a. The fourth request RQ4 may further include other transaction data (such as the fourth address). At step 334, the processing circuit 116 may compare the first device ID DE1 with each entry of the second table 114. At step 336, the processing circuit 116 may retrieve the first tag ID having the third tag value TV3 from the second table 114 based on the comparison of the first device ID DE1 with each entry of the second table 114. At step 338, the processing circuit 116 may store the mapping between the fourth transaction ID TC4, the first device ID DE1, and the first tag ID having the third tag value TV3 in the third entry ET3 of the first table 112. At step 340, the processing circuit 116 may provide the fourth request RQ4 to the third device 104.

At step 342, the processing circuit 116 may receive the first response RE1 for the first request RQ1 from the third device 104. At step 344, the processing circuit 116 may compare the first transaction ID TC1 and the first device ID DE1 included in the first response RE1 with each entry of the first table 112.

Figure 3C:
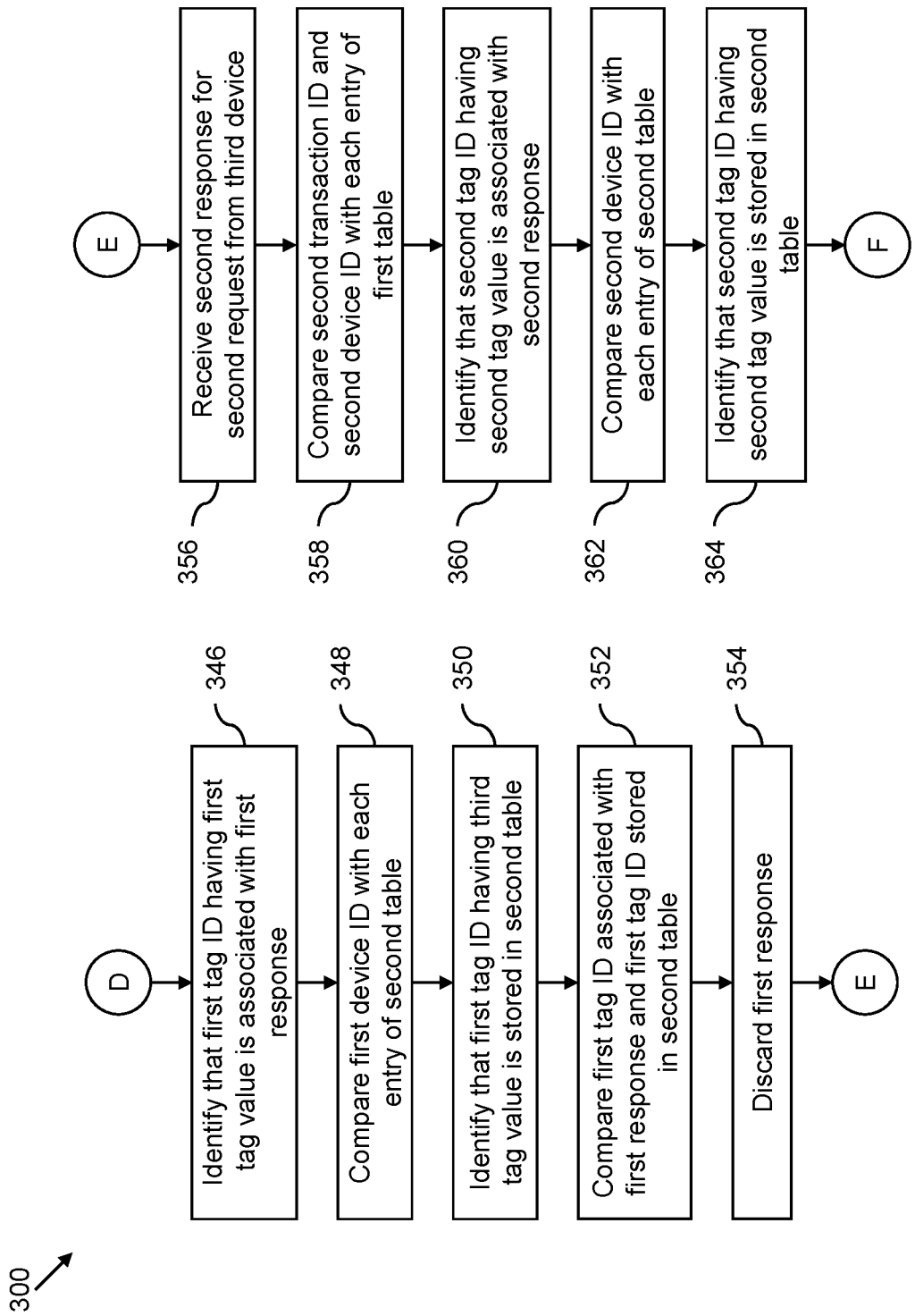

Referring now to FIG. 3C, at step 346, the processing circuit 116 may identify that the first tag ID having the first tag value TV1 is associated with the first response RE1 based on the comparison of the first transaction ID TC1 and the first device ID DE1 with each entry of the first table 112. At step 348, the processing circuit 116 may compare the first device ID DE1 included in the first response RE1 with each entry of the second table 114. At step 350, the processing circuit 116 may identify that the first tag ID having the third tag value TV3 is stored in the second table 114 based on the comparison of the first device ID DE1 with each entry of the second table 114. At step 352, the processing circuit 116 may compare the first tag ID associated with the first response RE1 with the first tag ID stored in the second table 114. At step 354, the processing circuit 116 may discard the first response RE1 based on the first tag ID associated with the first response RE1 being different from the first tag ID stored in the second table 114.

At step 356, the processing circuit 116 may receive the second response RE2 for the second request RQ2 from the third device 104. At step 358, the processing circuit 116 may compare the second transaction ID TC2 and the second device ID DE2 included in the second response RE2 with each entry of the first table 112. At step 360, the processing circuit 116 may identify that the second tag ID having the second tag value TV2 is associated with the second response RE2 based on the comparison of the second transaction ID TC2 and the second device ID DE2 with each entry of the first table 112. At step 362, the processing circuit 116 may compare the second device ID DE2 included in the second response RE2 with each entry of the second table 114. At step 364, the processing circuit 116 may identify that the second tag ID having the second tag value TV2 is stored in the second table 114 based on the comparison of the second device ID DE2 with each entry of the second table 114.

Figure 3D:
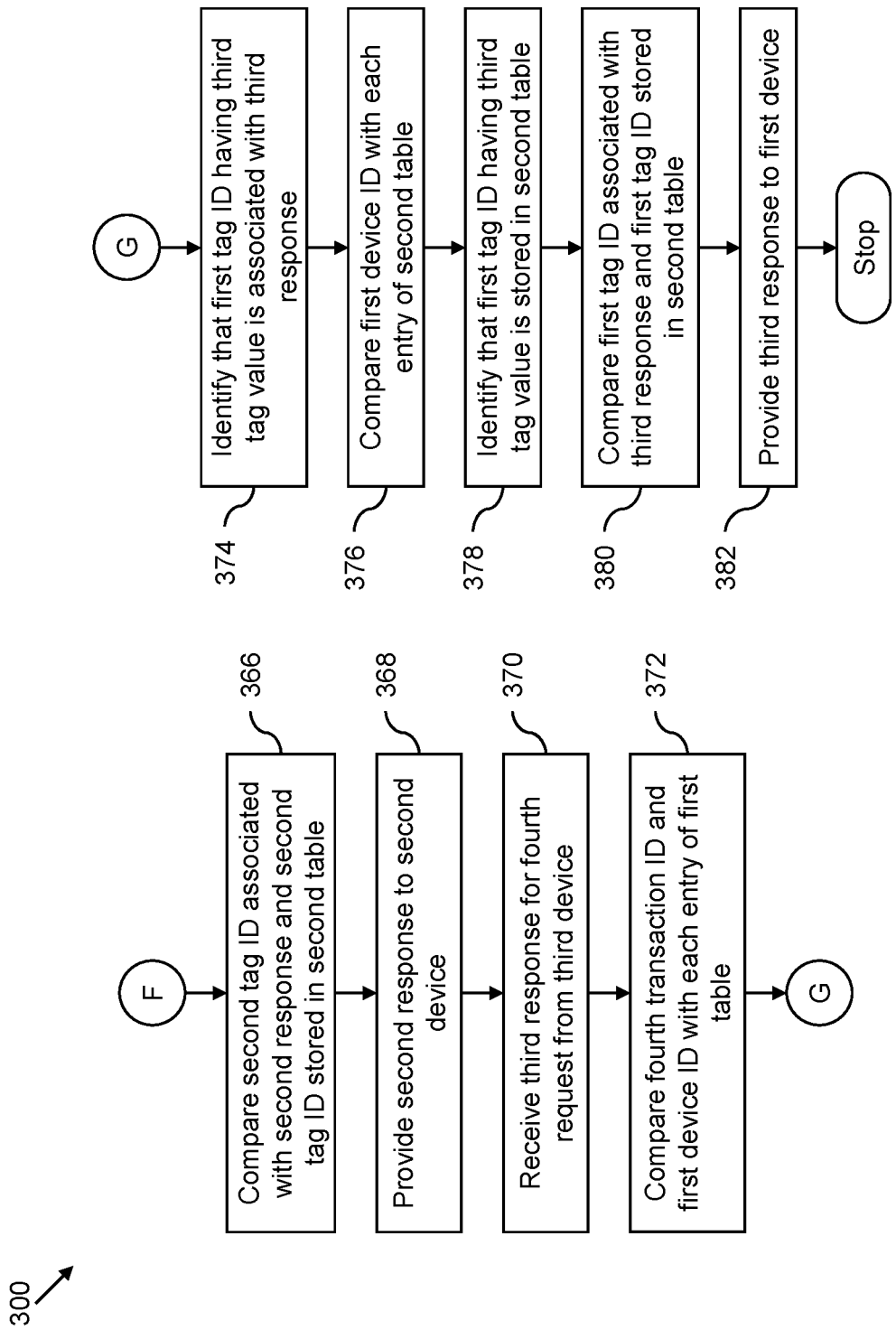

Referring now to FIG. 3D, at step 366, the processing circuit 116 may compare the second tag ID associated with the second response RE2 with the second tag ID stored in the second table 114. At step 368, the processing circuit 116 may provide the second response RE2 to the second device 102b based on the second tag ID associated with the second response RE2 being same as the second tag ID stored in the second table 114.

At step 370, the processing circuit 116 may receive the third response RE3 for the fourth request RQ4 from the third device 104. At step 372, the processing circuit 116 may compare the fourth transaction ID TC4 and the first device ID DE1 included in the third response RE3 with each entry of the first table 112. At step 374, the processing circuit 116 may identify that the first tag ID having the third tag value TV3 is associated with the third response RE3 based on the comparison of the fourth transaction ID TC4 and the first device ID DE1 with each entry of the first table 112. At step 376, the processing circuit 116 may compare the first device ID DE1 included in the third response RE3 with each entry of the second table 114. At step 378, the processing circuit 116 may identify that the first tag ID having the third tag value TV3 is stored in the second table 114 based on the comparison of the first device ID DE1 with each entry of the second table 114. At step 380, the processing circuit 116 may compare the first tag ID associated with the third response RE3 with the first tag ID stored in the second table 114. At step 382, the processing circuit 116 may provide the third response RE3 to the first device 102a based on the first tag ID associated with the third response RE3 being same as the first tag ID stored in the second table 114.

Although it is described that the processing circuit 116 receives the reset query RST and the reference tag value REF from the core circuit 108, the scope of the present disclosure is not limited to it. In an alternate embodiment, the core circuit 108 may not provide the reference tag value REF to the processing circuit 116. In such a scenario, at step 324, the processing circuit 116 may receive exclusively the reset query RST from the core circuit 108. Further, the processing circuit 116 may update the first tag ID from the first tag value TV1 to the third tag value TV3 based on the predefined set of rules associated with the processing circuit 116.

The core circuit 108 and the transaction management system 106 of the present disclosure thus ensure that the fault detected in the first device 102a does not lead to an operational failure of the IC 100. In conventional transaction management systems, when a reset query is received, an acknowledgment is not generated until all the ongoing transactions are completed (e.g., until responses associated with all the ongoing transactions are received). As a result, an associated core circuit is required to wait for a significant amount of time to reset a faulty device. The delay in the reset operation degrades the performance (e.g., the availability) of the core circuit and increases the latency for resetting a faulty device.

In the transaction management system 106, when the reset query RST is received from the core circuit 108, the first tag ID in the second table 114 is updated and the acknowledgment ACK is immediately provided to the core circuit 108. Thus, the core circuit 108 is not required to wait for the ongoing transactions to be completed for resetting the first device 102a. Hence, the utilization of the tag ID for the requests provided to the third device 104 prevents delaying the reset of the first device 102a. As a result, the performance (e.g., the availability) of the core circuit 108 is significantly greater than that of core circuits associated with the conventional transaction management systems. Additionally, the latency for resetting the faulty device (e.g., the first device 102a) is significantly less than that associated with the conventional transaction management systems.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:

1. An integrated circuit (IC), comprising:
a first device and a second device, wherein the first device is configured to initiate a first transaction to be performed on the second device;
a storage circuit configured to store (i) a mapping between a first transaction identifier (ID) of the first transaction, a device ID of the first device, and a tag ID of the first device in a first table, and (ii) a mapping between the device ID and the tag ID in a second table, wherein the tag ID in each of the first table and the second table has a first tag value; and
a processing circuit that is coupled to the storage circuit, the first device, and the second device, and configured to:
receive a reset query to determine an availability of the first device for reset;
update, in the second table, the tag ID from the first tag value to a second tag value based on the reset query;
generate an acknowledgment for the reset query to indicate that the first device is available for reset, wherein the first device is reset based on the acknowledgment;
receive, from the second device after the reset of the first device, a first response for the first transaction;
identify that the tag ID having the first tag value is associated with the first response based on the mapping stored in the first table; and
discard the first response based on the tag ID associated with the first response being different from the tag ID stored in the second table.

2. The IC of claim 1, wherein the first device is further configured to generate a first request based on the initiation of the first transaction, wherein the first transaction is initiated by the first device before the reset of the first device, and wherein the first request comprises the first transaction ID and the device ID.

3. The IC of claim 2, wherein the processing circuit is further configured to:
receive, from the first device, the first request for the first transaction;
retrieve, based on the device ID, the tag ID from the second table, wherein the tag ID retrieved from the second table has the first tag value as the first request is received before the reset of the first device;
store, in the first table, the mapping between the first transaction ID, the device ID, and the tag ID having the first tag value; and
provide the first request to the second device, wherein the reset query is received after the first request is provided to the second device.

4. The IC of claim 1, further comprising a core circuit that is configured to:
detect a fault in the first device;
determine that the first device is to be reset to recover the first device from the fault;
generate the reset query to determine the availability of the first device for reset;
provide the reset query to the processing circuit;
receive, as a response to the reset query, the acknowledgment from the processing circuit; and
reset the first device based on the acknowledgment.

5. The IC of claim 4, wherein the processing circuit comprises:
a transaction controller that is coupled to the core circuit, and configured to (i) receive the reset query from the core circuit, (ii) generate, based on the reset query, a trigger signal indicating that the tag ID in the second table is to be updated, and (iii) generate and provide the acknowledgment to the core circuit as the response to the reset query; and
a table controller that is coupled to the transaction controller, and configured to receive the trigger signal and update the tag ID from the first tag value to the second tag value in the second table based on the trigger signal.

6. The IC of claim 1, further comprising a core circuit that is configured to:
detect a fault in the first device;
determine that the first device is to be reset to recover the first device from the fault;
generate the reset query and a reference tag value, wherein the reset query is generated to determine the availability of the first device for reset, and wherein the reference tag value corresponds to the second tag value;
provide the reset query and the reference tag value to the processing circuit;

receive, as a response to the reset query, the acknowledgment from the processing circuit; and reset the first device based on the acknowledgment.

7. The IC of claim 6, wherein the processing circuit comprises:

a transaction controller that is coupled to the core circuit, and configured to (i) receive the reset query and the reference tag value from the core circuit, (ii) generate, based on the reset query, a trigger signal indicating that the tag ID in the second table is to be updated, and (iii) generate and provide the acknowledgment to the core circuit as the response to the reset query; and a table controller that is coupled to the transaction controller, and configured to (i) receive the trigger signal and the reference tag value and (ii) update the tag ID from the first tag value to the second tag value in the second table based on the trigger signal and the reference tag value.

8. The IC of claim 1, wherein the second device is configured to generate the first response for the first transaction and provide the first response to the processing circuit, and wherein the first response comprises the first transaction ID and the device ID.

9. The IC of claim 8, wherein the first table comprises a first plurality of entries and the second table comprises a second plurality of entries, wherein the mapping between the first transaction ID, the device ID, and the tag ID having the first tag value is stored in a first entry of the first plurality of entries, and wherein the mapping between the device ID and the tag ID is stored in a second entry of the second plurality of entries.

10. The IC of claim 9, wherein the processing circuit is further configured to:

compare the first transaction ID and the device ID with each entry of the first plurality of entries, wherein the processing circuit identifies that the tag ID having the first tag value is associated with the first response based on the comparison of the first transaction ID and the device ID with each entry of the first plurality of entries;

compare the device ID with each entry of the second plurality of entries;

identify that the tag ID having the second tag value is stored in the second table based on the comparison of the device ID with each entry of the second plurality of entries; and compare the tag ID associated with the first response with the tag ID stored in the second table, wherein the first response is discarded based on a mismatch between the tag ID associated with the first response and the tag ID stored in the second table.

11. The IC of claim 9, wherein the processing circuit comprises (i) a response controller that is coupled to the second device and (ii) a table controller that is coupled to the response controller and the storage circuit, and wherein the response controller is configured to:

receive the first response from the second device;

generate, to identify the tag ID associated with the first response, a first tag query that comprises the first transaction ID and the device ID;

generate, to identify the tag ID stored in the second table, a second tag query that comprises the device ID;

provide the first tag query and the second tag query to the table controller;

receive, from the table controller, the tag ID having the first tag value as a response to the first tag query and the tag ID having the second tag value as a response to the second tag query; and compare the response to the first tag query with the response to the second tag query; and discard the first response based on a mismatch between the response to the first tag query and the response to the second tag query.

12. The IC of claim 11, wherein the table controller is configured to (i) receive the first tag query from the response controller, (ii) compare the first transaction ID and the device ID with each entry of the first plurality of entries, (iii) identify that the tag ID having the first tag value is associated with the first response based on the comparison of the first transaction ID and the device ID with each entry of the first plurality of entries, and (iv) provide, to the response controller, the tag ID having the first tag value as the response to the first tag query, and wherein the table controller is further configured to (i) receive the second tag query from the response controller, (ii) compare the device ID with each entry of the second plurality of entries, (iii) identify that the tag ID having the second tag value is stored in the second table based on the comparison of the device ID with each entry of the second plurality of entries, and (iv) provide, to the response controller, the tag ID having the second tag value as the response to the second tag query.

13. The IC of claim 1, wherein the first device is further configured to initiate a second transaction to be performed on the second device, generate a second request for the second transaction, and provide the second request to the processing circuit, wherein the second request comprises a second transaction ID of the second transaction and the device ID of the first device, wherein the second transaction is initiated by the first device before the reset of the first device, and wherein the processing circuit is further configured to discard the second request as the reset query is received before the second request is provided to the second device.

14. The IC of claim 1, wherein the first device is further configured to initiate, after the reset of the first device, a third transaction to be performed on the second device, and generate a third request for the third transaction such that the third request comprises a third transaction ID of the third transaction and the device ID of the first device, wherein the processing circuit is further configured to receive the third request for the third transaction and retrieve the tag ID from the second table based on the device ID, wherein the tag ID retrieved from the second table has the second tag value as the third transaction is initiated after the reset of the first device, and wherein the processing circuit is further configured to store a mapping between the third transaction ID, the device ID, and the tag ID having the second tag value in the first table and provide the third request to the second device.

15. The IC of claim 14, wherein the first table comprises a first plurality of entries and the second table comprises a second plurality of entries, wherein (i) the mapping between the first transaction ID, the device ID, and the tag ID having the first tag value is stored in a first entry of the first plurality of entries, (ii) the mapping between the third transaction ID, the device ID, and the tag ID having the second tag value is stored in a second entry of the first plurality of entries, and (iii) the mapping between the device ID and the tag ID is stored in a third entry of the second plurality of entries, and wherein the tag ID stored in the second table has the first tag value before the reset of the first device and the second tag value after the reset of the first device.

16. The IC of claim 15, wherein the second device is further configured to generate a second response for the third transaction such that the second response comprises the third transaction ID and the device ID.

17. The IC of claim 16, wherein the processing circuit is further configured to: receive, from the second device, the second response for the third request;

compare the third transaction ID and the device ID with each entry of the first plurality of entries;

identify that the tag ID having the second tag value is associated with the second response based on the comparison of the third transaction ID and the device ID with each entry of the first plurality of entries;

compare the device ID with each entry of the second plurality of entries;

identify that the tag ID having the second tag value is stored in the second table based on the comparison of the device ID with each entry of the second plurality of entries;

compare the tag ID associated with the second response and the tag ID stored in the second table; and provide the second response to the first device based on the tag ID associated with the second response being same as the tag ID stored in the second table.

18. The IC of claim 16, wherein the processing circuit comprises (i) a response controller that is coupled to the first device and the second device, and (ii) a table controller that is coupled to the response controller and the storage circuit, and wherein the response controller is configured to:

receive the second response from the second device;

generate, to identify the tag ID associated with the second response, a third tag query that comprises the third transaction ID and the device ID;

generate, to identify the tag ID stored in the second table, a fourth tag query that comprises the device ID;

provide the third tag query and the fourth tag query to the table controller;

receive, from the table controller, the tag ID having the second tag value as a response to each of the third tag query and the fourth tag query;

compare the response to the third tag query with the response to the fourth tag query; and provide the second response to the first device based on the response to the third tag query being same as the response to the fourth tag query.

19. The IC of claim 18, wherein the table controller is configured to (i) receive the third tag query from the response controller, (ii) compare the third transaction ID and the device ID with each entry of the first plurality of entries, (iii) identify that the tag ID having the second tag value is associated with the second response based on the comparison of the third transaction ID and the device ID with each entry of the first plurality of entries, and (iv) provide, to the response controller, the tag ID having the second tag value as the response to the third tag query, and wherein the table controller is further configured to (i) receive the fourth tag query from the response controller, (ii) compare the device ID with each entry of the second plurality of entries, (iii) identify that the tag ID having the second tag value is stored in the second table based on the comparison of the device ID with each entry of the second plurality of entries, and (iv) provide, to the response controller, the tag ID having the second tag value as the response to the fourth tag query.

20. A transaction management method, comprising:

receiving, by a processing circuit, a reset query to determine an availability of a first device for reset, wherein a first transaction is initiated by the first device to be performed on a second device, wherein a mapping between a first transaction identifier (ID) of the first transaction, a device ID of the first device, and a tag ID of the first device is stored in a first table, and a mapping between the device ID and the tag ID is stored in a second table, and wherein the tag ID in each of the first table and the second table has a first tag value;

updating, by the processing circuit, in the second table, the tag ID from the first tag value to a second tag value based on the reset query;

generating, by the processing circuit, an acknowledgment for the reset query to indicate that the first device is available for reset, wherein the first device is reset based on the acknowledgment;

receiving, by the processing circuit, a first response for the first transaction from the second device after the reset of the first device;

identifying, by the processing circuit, that the tag ID having the first tag value is associated with the first response based on the mapping stored in the first table; and discarding, by the processing circuit, the first response based on the tag ID associated with the first response being different from the tag ID stored in the second table.

* * * * *